(12) United States Patent
Ju

(10) Patent No.: US 11,433,497 B2
(45) Date of Patent: Sep. 6, 2022

(54) TOOL MAGAZINE OF MACHINE TOOL

(71) Applicant: DOOSAN MACHINE TOOLS CO., LTD., Changwon-si (KR)

(72) Inventor: Taehwan Ju, Gimhae-si (KR)

(73) Assignee: DOOSAN MACHINE TOOLS CO., LTD., Changwon-si (KR)

( * ) Notice: Subject to any disclaimer, the term of this patent is extended or adjusted under 35 U.S.C. 154(b) by 105 days.

(21) Appl. No.: 16/960,040

(22) PCT Filed: Dec. 28, 2018

(86) PCT No.: PCT/KR2018/016859
§ 371 (c)(1),
(2) Date: Sep. 11, 2020

(87) PCT Pub. No.: WO2019/135561
PCT Pub. Date: Jul. 11, 2019

(65) Prior Publication Data
US 2021/0187681 A1    Jun. 24, 2021

(30) Foreign Application Priority Data

Jan. 3, 2018    (KR) .................. 10-2018-0000641

(51) Int. Cl.
*B23Q 3/157*    (2006.01)
*B23Q 3/155*    (2006.01)

(52) U.S. Cl.
CPC ...... *B23Q 3/15722* (2016.11); *B23Q 3/15539* (2016.11); *B23Q 3/15706* (2013.01);
(Continued)

(58) Field of Classification Search
CPC ........... Y10T 483/179; Y10T 483/1793; Y10T 483/1795; Y10T 483/1845;
(Continued)

(56) References Cited

U.S. PATENT DOCUMENTS 3,966,052 A * 6/1976 Knaus ..................... B25H 3/04
211/70.6
4,218,816 A * 8/1980 Dormehl ............... B23B 29/242
414/730
(Continued)

FOREIGN PATENT DOCUMENTS

DE    102012201776 A1 * 8/2013 ......... B23Q 3/15539
EP    2626171 B1    1/2014
(Continued)

OTHER PUBLICATIONS

International Search Report of PCT/KR2018/016859, dated Mar. 27, 2019, English translation.

*Primary Examiner* — Erica E Cadugan
*Assistant Examiner* — Michael Vitale
(74) *Attorney, Agent, or Firm* — STIP Law Group, LLC

(57) ABSTRACT

The present disclosure relates to a tool magazine for a machine tool, and more particularly, to a tool magazine for a machine tool, wherein tool receiving units of a tool magazine are provided in multiple stages in a vertical turning center, such that a spindle head may easily change internal diameter machining tools and external diameter machining tools while moving in a horizontal direction and a vertical direction.

8 Claims, 12 Drawing Sheets

(52) U.S. Cl.
CPC ...... *B23Q 3/15753* (2013.01); *B23Q 3/15534* (2016.11); *Y10T 483/1795* (2015.01); *Y10T 483/1882* (2015.01)

(58) Field of Classification Search
CPC ......... Y10T 483/1855; Y10T 483/1873; Y10T 483/1882; B23Q 3/15506; B23Q 3/15706; B23Q 3/15726; B23Q 3/15733; B23Q 3/1574; B23Q 3/15746; B23Q 3/15753; B23Q 3/1576; B23Q 3/15766
USPC ...................... 483/54, 55, 56, 63, 64, 66, 67
See application file for complete search history.

(56) References Cited

U.S. PATENT DOCUMENTS

| | | | | |
|---|---|---|---|---|
| 4,394,908 A | * | 7/1983 | Pinchemaille | B23Q 3/15722 211/1.54 |
| 4,419,807 A | * | 12/1983 | Moulin | B23Q 3/15526 483/59 |
| 5,364,329 A | * | 11/1994 | Line | B23Q 3/15539 483/56 |
| 2011/0015050 A1 | * | 1/2011 | Hakamata | B23Q 3/15722 483/67 |
| 2012/0220437 A1 | * | 8/2012 | Hayashi | B23Q 3/15722 483/30 |
| 2017/0190009 A1 | * | 7/2017 | Cai | B23Q 3/15539 |
| 2017/0282316 A1 | | 10/2017 | Schmieder et al. | |

FOREIGN PATENT DOCUMENTS

| | | | | |
|---|---|---|---|---|
| FR | 2515948 A1 | * | 5/1983 | ......... B23Q 3/15539 |
| JP | 60099541 A | * | 6/1985 | ......... B23Q 3/15733 |
| JP | 60123240 A | * | 7/1985 | ......... B23Q 3/15746 |
| JP | 6246389 B2 | | 12/2017 | |
| KR | 1020080067037 A | | 7/2008 | |
| KR | 101238237 B1 | | 3/2013 | |
| SU | 1135593 A1 | * | 1/1985 | ........... B23Q 3/1578 |

* cited by examiner

FIG. 12

The tool magazine comprises a third tool receiving unit that is rotatably installed on the rotary shaft unit so as to be vertically spaced apart from an upper side of the second tool receiving unit and that is configured to receive a third plurality of tools disposed radially based on the rotation center of the rotary shaft unit

TOOL MAGAZINE OF MACHINE TOOL

CROSS-REFERENCE TO RELATED APPLICATIONS

This application is the U.S. National Phase under 35 U.S.C. § 371 of International Application No. PCT/KR2018/016859 filed on Dec. 28, 2018, which in turn claims the benefit of Korean Application No. 10-2018-0000641, filed on Jan. 3, 2018, the disclosures of which are incorporated by reference into the present application.

FIELD OF THE DISCLOSURE

The present disclosure relates to a tool magazine for a machine tool, and more particularly, to a tool magazine for a machine tool, wherein tool receiving units of a tool magazine are provided in multiple stages in a vertical turning center, such that a spindle head may easily change internal diameter machining tools and external diameter machining tools while moving in a horizontal direction and a vertical direction.

BACKGROUND OF THE DISCLOSURE

In general, a machine tool refers to a machine used to process metal/non-metal workpieces in a desired shape and dimension using a suitable tool by using various types of cutting or non-cutting methods.

Various types of machine tools including a turning center, a vertical/horizontal machining center, a door-type machining center, a Swiss turning machine, an electric discharge machine, a horizontal NC boring machine, a CNC lathe, and a multi-tasking machining center are being widely used to suit the purpose of the corresponding work in various industrial sites.

The multi-tasking machining center, among the machine tools, refers to a turning center equipped with a multifunctional automatic tool changer (ATC) and a tool magazine in order to perform various types of processing such as turning machining, drilling, tapping, or milling. In the case of the multi-tasking machining center, an operator manually mounts a tool on a tool magazine when loading the tool required for a machining process or changing the tools.

In general, various types of currently used machine tools each have a control panel to which a numerical control (NC) technology or a computerized numerical control (CNC) technology is applied. The control panel is provided with a multifunctional switch or button, and a monitor.

Further, the machine tool includes a table on which a material, i.e., a workpiece is seated and which transfers the workpiece to machine the workpiece, a palette used to prepare the workpiece to be machined, a main shaft coupled to a tool or the workpiece and configured to be rotated, and a tailstock and a steady rest configured to support the workpiece during the machining process.

In general, the machine tool is provided with a transfer unit configured to transfer the table, a tool post, the main shaft, the tailstock, and the steady rest along a transfer shaft in order to perform various types of machining.

In general, the machine tool uses a plurality of tools in order to perform various types of machining, and a tool magazine or a turret is used in the form of a tool storage place for receiving and storing the plurality of tools.

The machine tool uses the plurality of tools in order to perform various types of machining, and the tool magazine is used in the form of a tool storage place for receiving and storing the plurality of tools.

In general, the machine tool is equipped with an automatic palette changer (APC) in order to minimize the non-processing time. The automatic palette changer (APC) automatically changes the palettes between a workpiece machining region and a workpiece loading region. The workpiece may be mounted on the palette.

In general, the machine tool is equipped with the automatic tool changer (ATC) configured to withdraw a specific tool from the tool magazine or remount the tool on the tool magazine based on an instruction of a numerical control unit in order to improve productivity of the machine tool.

In general, the types of tool magazines used for the machine tools, especially, the machining center or the turning center, may be broadly classified into two types. One is a drum type tool magazine, and the other is a chain type tool magazine.

Further, the automatic tool changers (ATC) used in the related art are classified into an arm type automatic tool changer and an armless type automatic tool changer based on a method of clamping a tool.

In general, the armless type automatic tool changer (ATC) changes a plurality of tools provided on a magazine plate of a tool magazine only by using motions of a column and a spindle without using a separate change arm, and the armless type automatic tool changer is mainly used for a vertical type machining center or a vertical type turning center.

The vertical type machining center or the vertical type turning center machines a workpiece with a tool mounted on the spindle.

As illustrated in FIGS. 1 to 3, in a case in which the vertical turning center in the related art performs an internal diameter machining process or an external diameter machining process through a turning process, the tools need to be frequently changed due to abrasion of the tools.

However, as illustrated in FIG. 3, because an internal diameter machining tool holder 5, to which an internal diameter machining tool 6 is coupled, and an external diameter machining tool holder 7, to which an external diameter machining tool 8 is coupled, are installed adjacent to each other in a tool magazine for a machine tool in the related art, a collision may occur due to interference with a workpiece 2. In order to prevent the collision, an operator often changes the internal diameter machining tools and the external diameter machining tools, which causes a problem in that productivity of the machine tool deteriorates and the operator is inconvenienced.

Further, the tool magazine for a machine tool in the related art has one type of tool having a directionality (a vertical direction in the case of the internal diameter machining tool and a horizontal direction in the case of the external diameter machining tool), and thus the tool magazine cannot receive various types of tools, which causes a problem in that a size of the tool magazine is increased and a size of the machine tool cannot be finally reduced.

In addition, because the tool magazine for a machine tool in the related art has only the tool (the internal diameter machining tool or the external diameter machining tool) having a single directionality when the vertical turning center moves in the horizontal direction or the vertical direction, the amount of time required to change the tools for performing a corresponding process is increased, which causes a problem in that productivity and reliability of the machine tool deteriorate.

DISCLOSURE

Summary

The present disclosure has been made in an effort to solve the above-mentioned problems, and an object of the present disclosure is to provide a tool magazine for a machine tool, wherein a tool receiving direction of a second tool receiving unit is orthogonal to a tool receiving direction of a first tool receiving unit, such that a spindle head may easily change internal diameter machining tools and external diameter machining tools while moving in a horizontal direction and a vertical direction, and the number of types of tools to be mounted on a tool magazine may be increased, thereby minimizing non-machining time, improving productivity of the machine tool, achieving convenience for an operator, reducing machining costs of the machine tool, improving stability and reliability of the machine tool, and reducing a size of the machine tool.

In order to achieve the above-mentioned object of the present disclosure, a tool magazine for a machine tool according to the present disclosure may include: a base unit installed in a part of a space in which a spindle head moves; a support unit installed to be perpendicular to the base unit; a rotary shaft unit rotatably installed in the support unit; a first tool receiving unit rotatably installed on the rotary shaft unit and configured to receive a plurality of tools disposed radially based on a rotation center of the rotary shaft unit; and a second tool receiving unit rotatably installed on the rotary shaft unit so as to be spaced apart vertically from an upper side of the first tool receiving unit and configured to receive a plurality of tools disposed radially based on the rotation center of the rotary shaft unit, wherein a tool receiving direction of the second tool receiving unit is orthogonal to a tool receiving direction of the first tool receiving unit.

Further, in another exemplary embodiment of the tool magazine for a machine tool according to the present disclosure, the first tool receiving unit of the tool magazine for a machine tool may include: a first main body part rotatably installed on the rotary shaft unit; and a plurality of first gripper parts installed on the first main body part, disposed radially at a predetermined angle based on the rotation center of the rotary shaft unit, and configured to clamp a tool by pressing the tool.

In addition, in another exemplary embodiment of the tool magazine for a machine tool according to the present disclosure, the second tool receiving unit of the tool magazine for a machine tool may include: a second main body part rotatably installed on the rotary shaft unit so as to be spaced apart vertically from an upper side of the first main body part; and a plurality of second gripper parts installed on the second main body part, disposed radially at a predetermined angle based on the rotation center of the rotary shaft unit, and configured to clamp a tool by pressing the tool.

Further, in another exemplary embodiment of the tool magazine for a machine tool according to the present disclosure, a diameter of the first main body part of the tool magazine for a machine tool may be larger than a diameter of the second main body part.

Further, in another exemplary embodiment of the tool magazine for a machine tool according to the present disclosure, the first gripper parts may be disposed on the first main body part and the second gripper parts may be disposed on the second main body part so that a centerline of each of the first gripper parts of the tool magazine for a machine tool and a centerline of each of the second gripper parts intersect each other based on the rotation center.

In addition, in another exemplary embodiment of the tool magazine for a machine tool according to the present disclosure, the first gripper parts may be disposed on the first main body part and the second gripper parts may be disposed on the second main body part so that an angle between centerlines of the first gripper parts of the tool magazine for a machine tool is equal to an angle between centerlines of the second gripper parts.

Further, in another exemplary embodiment of the tool magazine for a machine tool according to the present disclosure, the first gripper parts may be disposed on the first main body part and the second gripper parts may be disposed on the second main body part so that a constant angle is formed between a centerline of the first gripper part of the tool magazine for a machine tool and a centerline of the second gripper part adjacent to the first gripper part.

In addition, in another exemplary embodiment of the tool magazine for a machine tool according to the present disclosure, an internal diameter machining tool for performing internal diameter machining on a workpiece may be installed on the first gripper part of the tool magazine for a machine tool, and an external diameter machining tool for performing external diameter machining on a workpiece may be installed on the second gripper part.

Further, in another exemplary embodiment of the tool magazine for a machine tool according to the present disclosure, the spindle head may change a tool installed on the first gripper part of the tool magazine for a machine tool while moving in a vertical direction, and the spindle head may change a tool installed on the second gripper part while moving in a horizontal direction.

In addition, in another exemplary embodiment of the tool magazine for a machine tool according to the present disclosure, the tool magazine for a machine tool may further include: a third tool receiving unit rotatably installed on the rotary shaft unit so as to be spaced apart vertically from an upper side of the second tool receiving unit and configured to receive a plurality of tools disposed radially based on the rotation center of the rotary shaft unit, in which a tool receiving direction of the third tool receiving unit may be in parallel with the tool receiving direction of the second tool receiving unit.

According to the tool magazine for a machine tool according to the present disclosure, since the tool receiving direction of the second tool receiving unit is orthogonal to the tool receiving direction of the first tool receiving unit, the spindle head may easily change the internal diameter machining tool and the external diameter machining tool while moving in the horizontal direction and the vertical direction, thereby minimizing non-machining time and improving productivity of the machine tool.

Further, according to the tool magazine for a machine tool according to the present disclosure, the tool receiving units are stacked in multiple stages, such that the number of types of tools to be mounted on the tool magazine may be increased, non-machining time may be reduced, and the tools to be changed may be easily stored, thereby achieving convenience and safety for an operator, reducing a size of the tool magazine, and making the machine tool compact.

In addition, according to the tool magazine for a machine tool according to the present disclosure, the internal diameter machining tool and the external diameter machining tool may be simultaneously used and easily changed, such that stability and reliability of the machine tool may be improved.

Furthermore, according to the tool magazine for a machine tool according to the present disclosure, the plurality of tools may be stored and the external diameter machining tool and the internal diameter machining tool may be easily changed, such that the broken tool may be quickly replaced, machining precision of the machine tool may be improved, and satisfaction of consumers may be increased.

DESCRIPTION OF THE DRAWINGS

FIG. 12 is a text box which advises that the tool magazine comprises a third tool receiving unit that is rotatably installed on the rotary shaft unit so as to be vertically spaced apart from an upper side of the second tool receiving unit and that is configured to receive a third plurality of tools disposed radially based on the rotation center of the rotary shaft unit.

DESCRIPTION OF MAIN REFERENCE NUMERALS OF DRAWINGS

Figure 1:
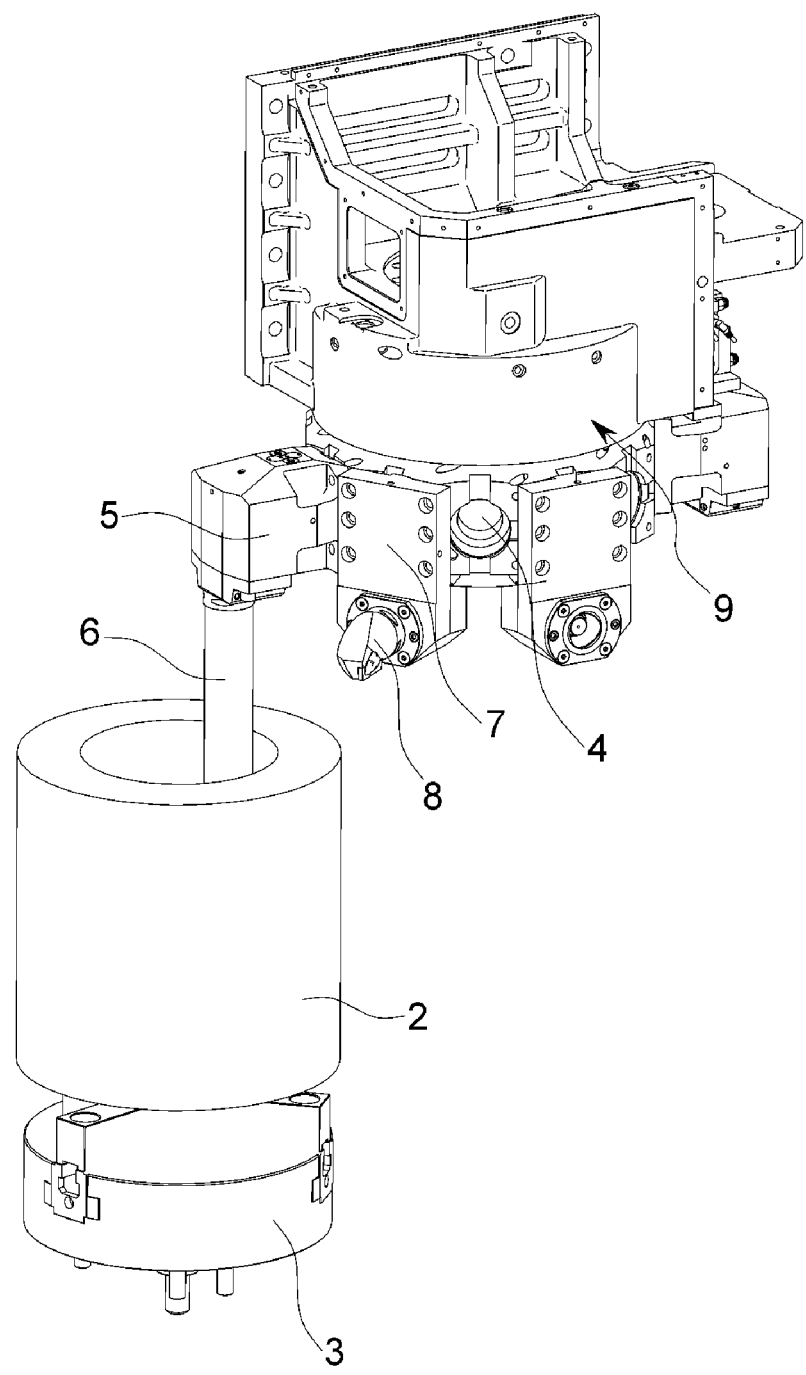
FIG. 1 is a conceptual view illustrating a state in which a workpiece is machined by an internal diameter machining tool in the related art.
Figure 2:
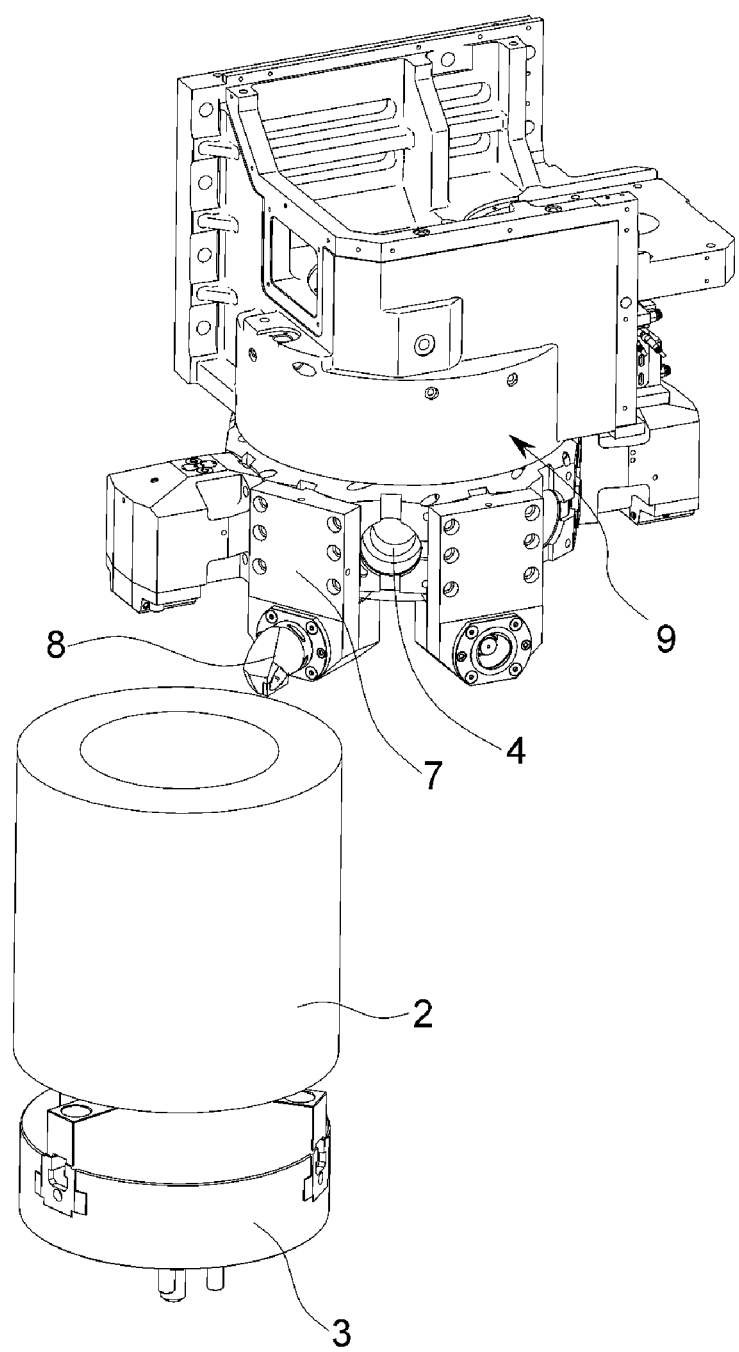
FIG. 2 is a conceptual view illustrating a state in which a workpiece is machined by an external diameter machining tool in the related art.
Figure 3:
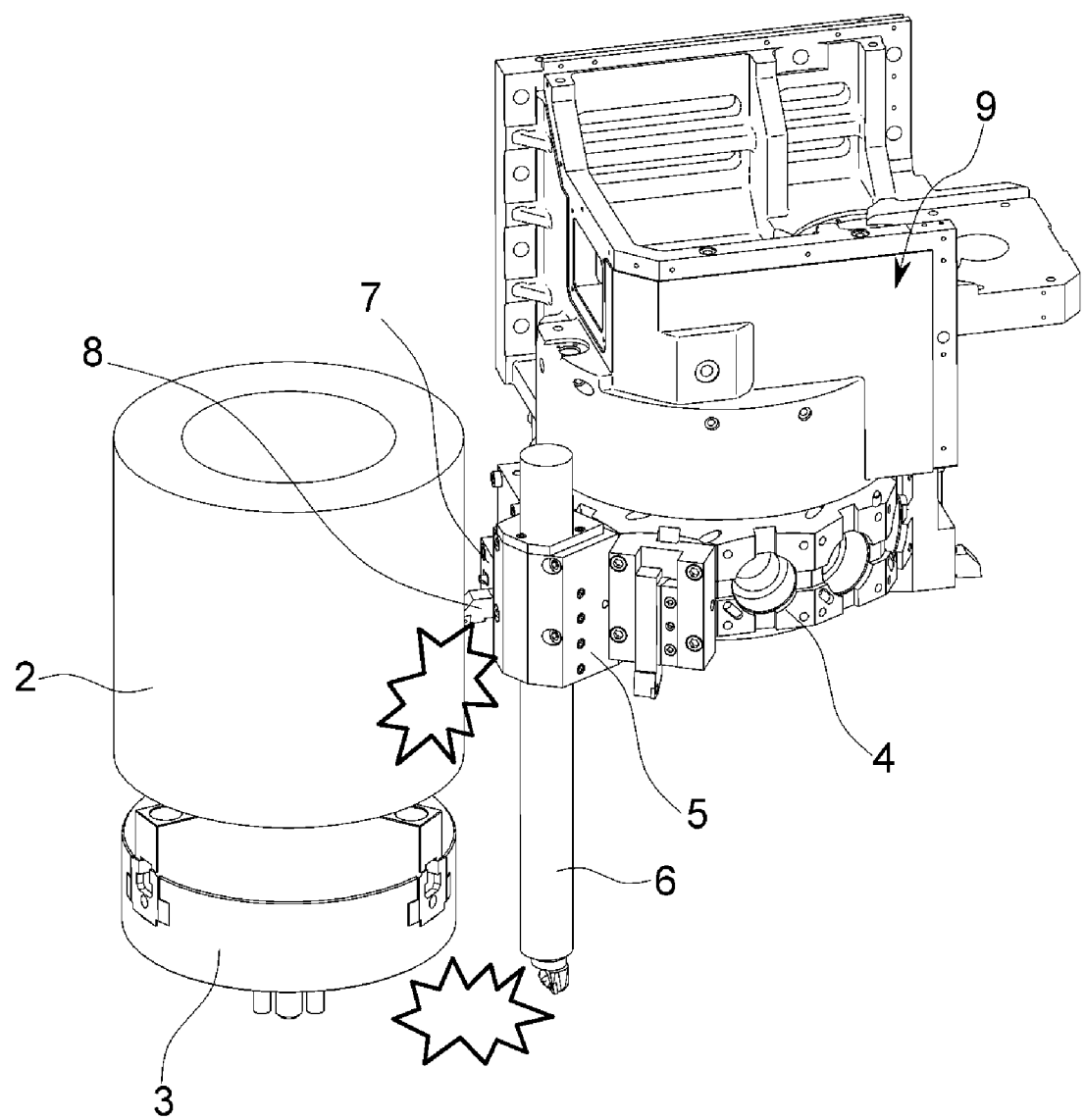
FIG. 3 is a conceptual view illustrating a state in which a collision occurs in a state in which an internal diameter machining tool and an external diameter machining tool are coupled in the related art.

1: Tool magazine
2: Workpiece
3: Chuck
4: Tool post
5: Internal diameter machining tool holder
6: Internal diameter machining tool
7: External diameter machining tool holder
8: External diameter machining tool
9: Spindle head
10: Base unit
20: Support unit
30: Rotary shaft unit
40: First tool receiving unit
41: First main body part
42: First gripper part
50: Second tool receiving unit
51: Second main body part
52: Second gripper part
A: Centerline of first gripper part
B: Centerline of second gripper part
C: Rotation center
D1: Diameter of first main body part
D2: Diameter of second main body part
α: Angle between first centerlines
β: Angle between second centerlines
θ: Angle between first centerline and second centerline

DETAILED DESCRIPTION OF CERTAIN INVENTIVE EMBODIMENT

Hereinafter, a tool magazine for a machine tool according to an exemplary embodiment of the present disclosure will be described in detail with reference to the drawings. The following exemplary embodiments are provided as examples for fully transferring the spirit of the present disclosure to those skilled in the art. Therefore, the present disclosure is not limited to the exemplary embodiments described below and may be specified as other aspects. Further, in the drawings, a size and a thickness of the apparatus may be exaggerated for convenience. Like reference numerals indicate like constituent elements throughout the specification.

Advantages and features of the present disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art can fully understand the scope of the present disclosure. The present disclosure will be defined only by the scope of the appended claims. Like reference numerals indicate like constituent elements throughout the specification. In the drawings, sizes and relative sizes of layers and regions may be exaggerated for clarity of description.

The terms used in the present specification are for explaining the exemplary embodiments, not for limiting the present disclosure. Unless particularly stated otherwise in the present specification, a singular form also includes a plural form. The terms such as "comprise (include)" and/or "comprising (including)" used in the specification do not exclude presence or addition of one or more other constituent elements, steps, operations, and/or elements, in addition to the mentioned constituent elements, steps, operations, and/or elements.

Figure 4:
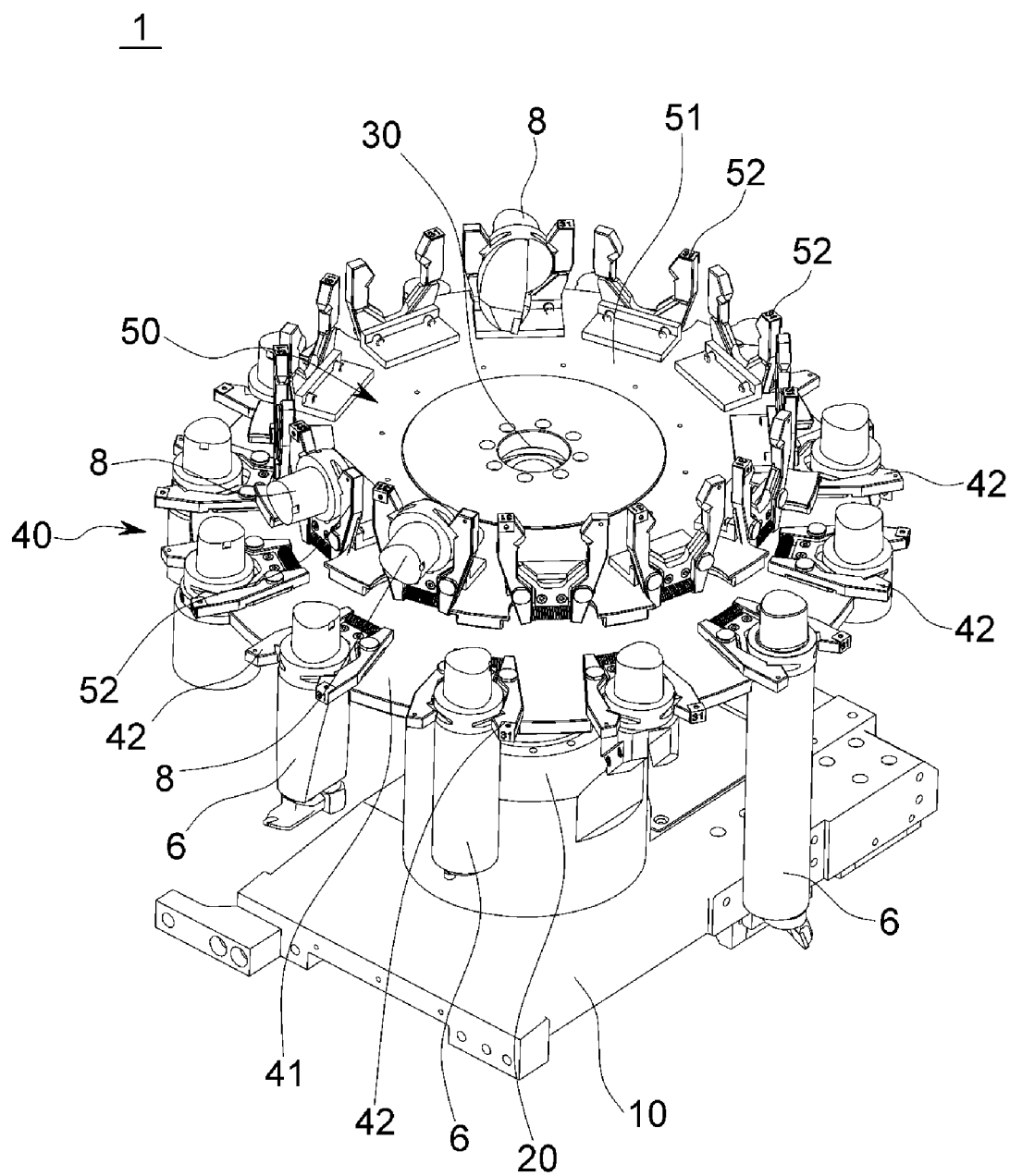
FIG. 4 is a perspective view of a tool magazine for a machine tool according to the present disclosure.
Figure 5:
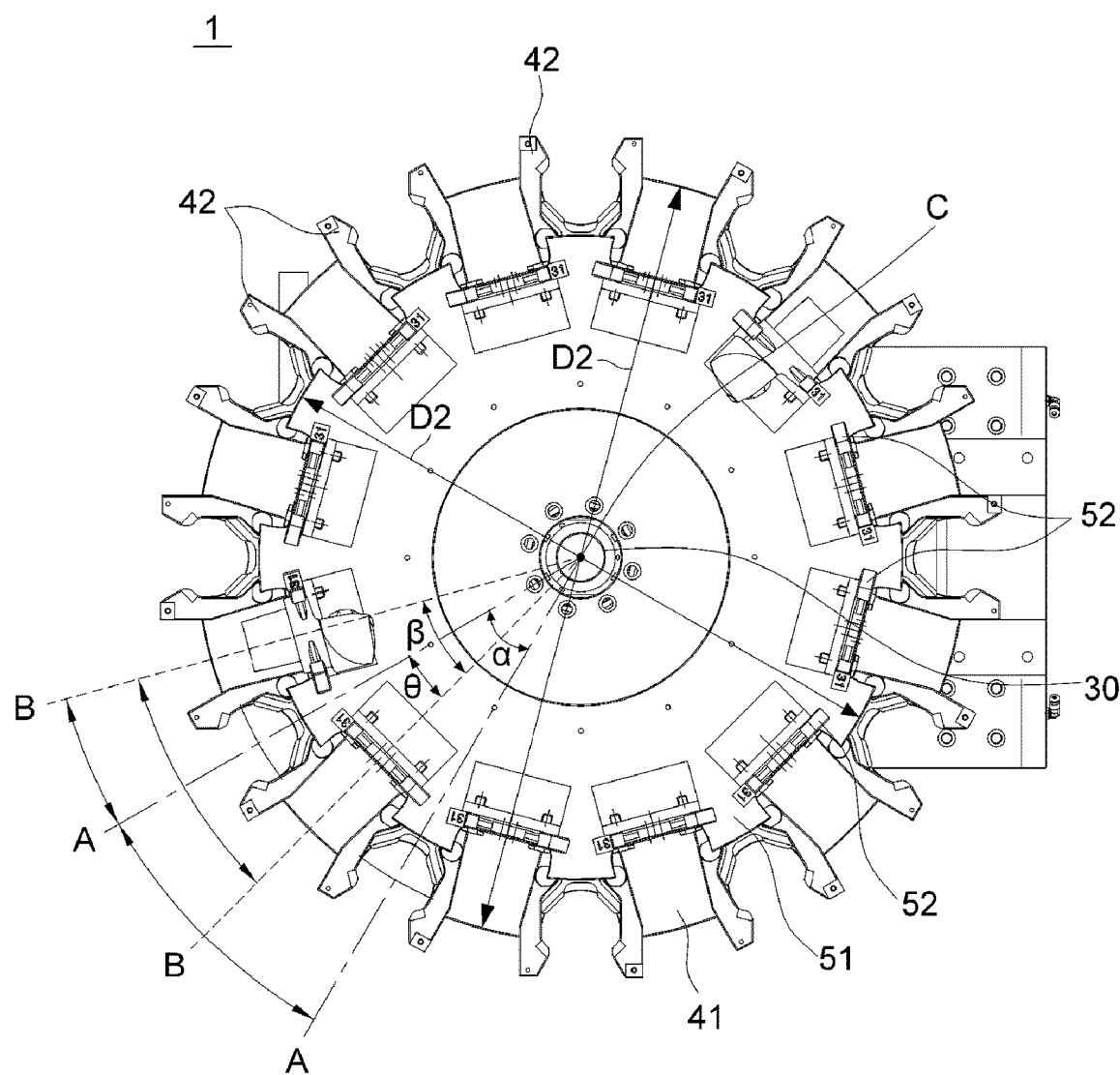
FIG. 5 is a partial top plan view of FIG. 4.
Figure 6:
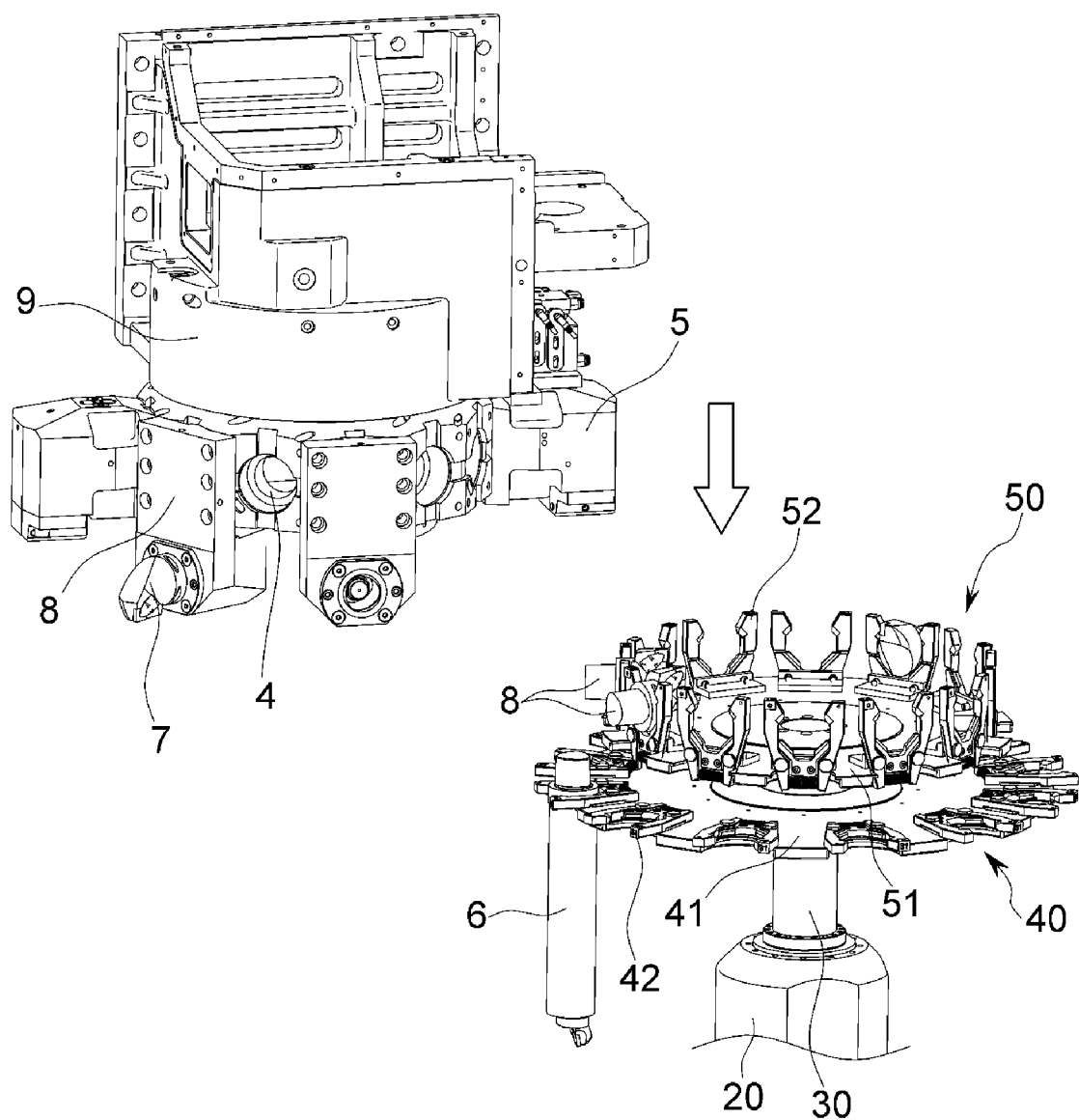
FIG. 6, FIG. 7 and FIG. 8 are views illustrating a process of changing tools in a first tool receiving unit of the tool magazine for a machine tool according to an exemplary embodiment of the present disclosure.
Figure 7:
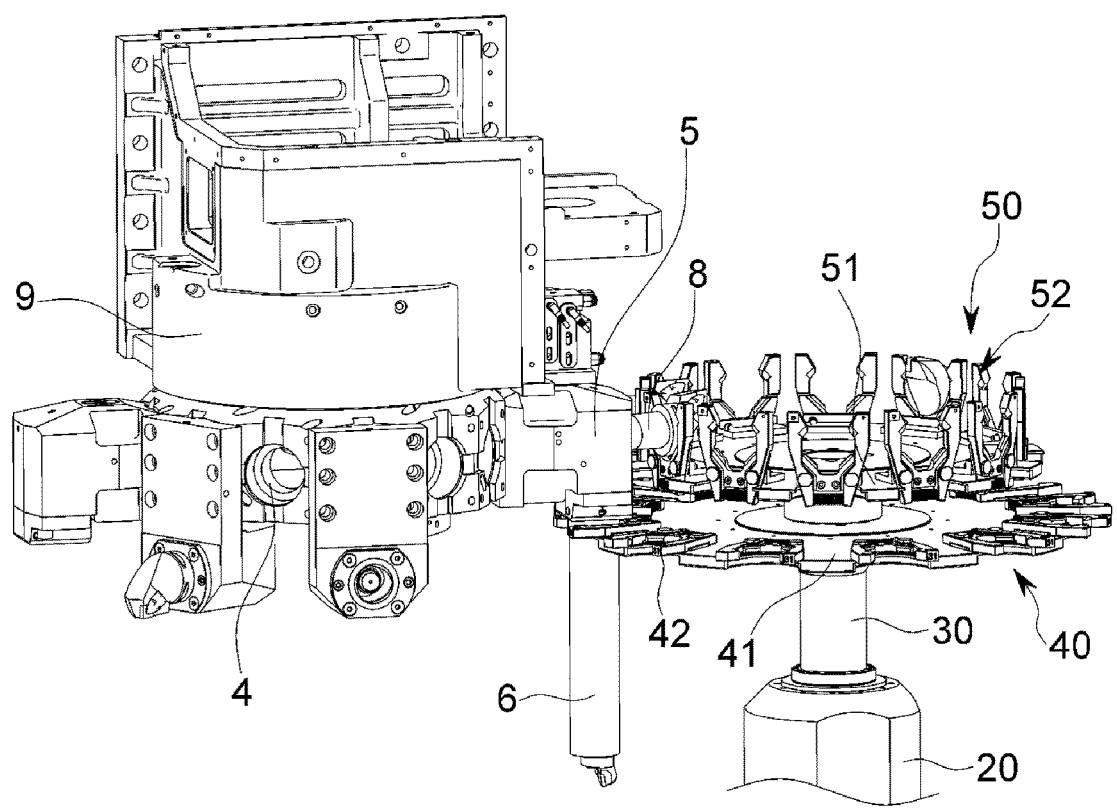
Figure 8:
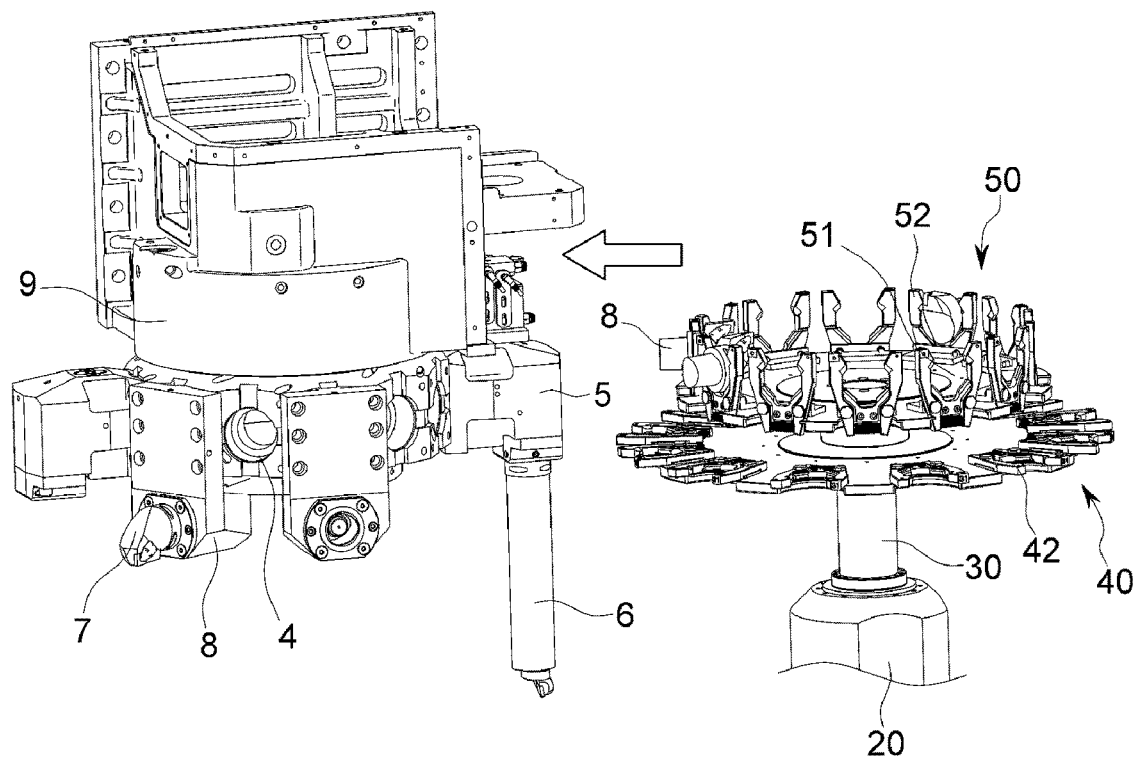
Figure 9:
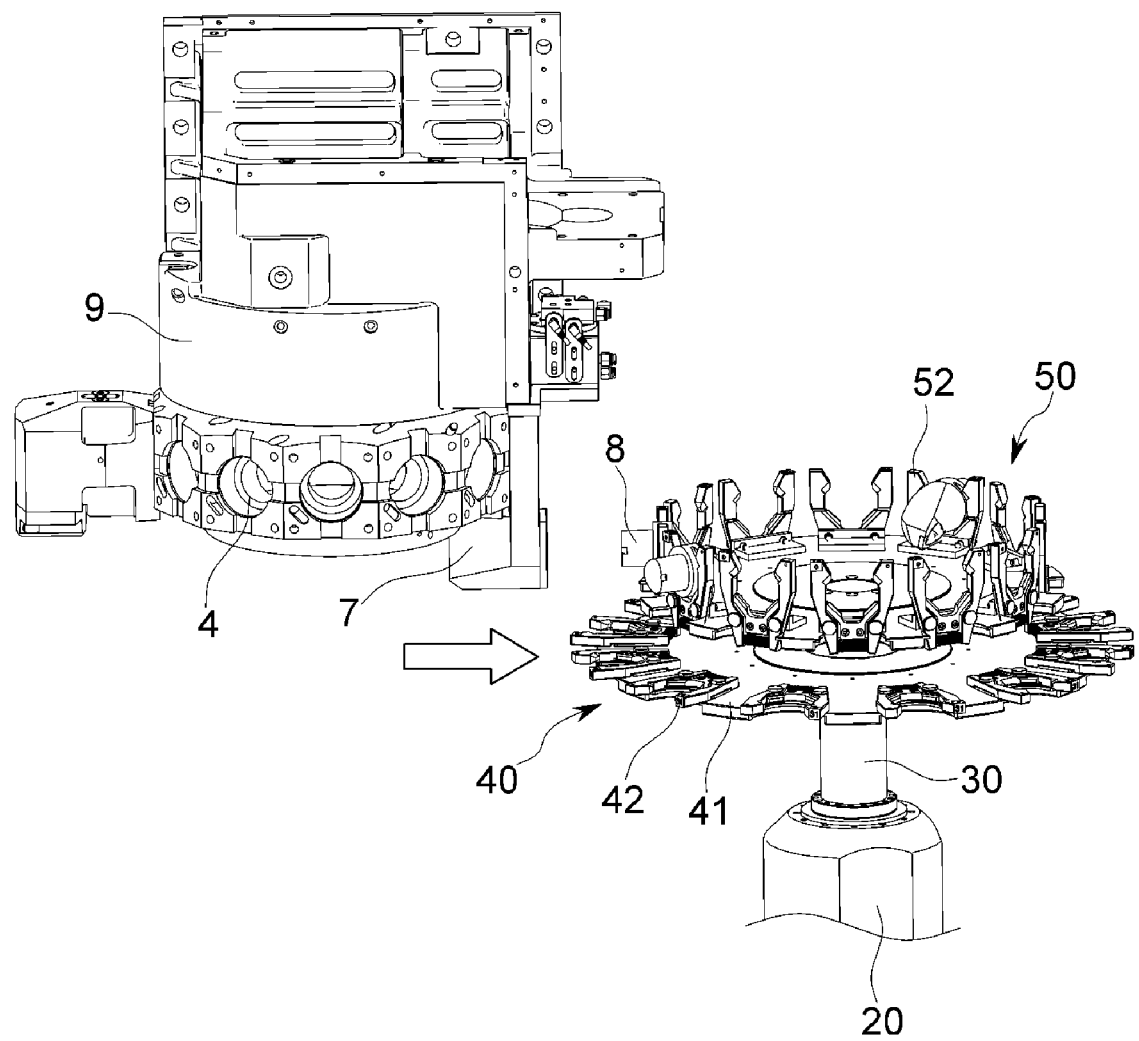
FIG. 9, FIG. 10 and FIG. 11 are views illustrating a process of changing tools in a second tool receiving unit of the tool magazine for a machine tool according to the exemplary embodiment of the present disclosure.
Figure 10:
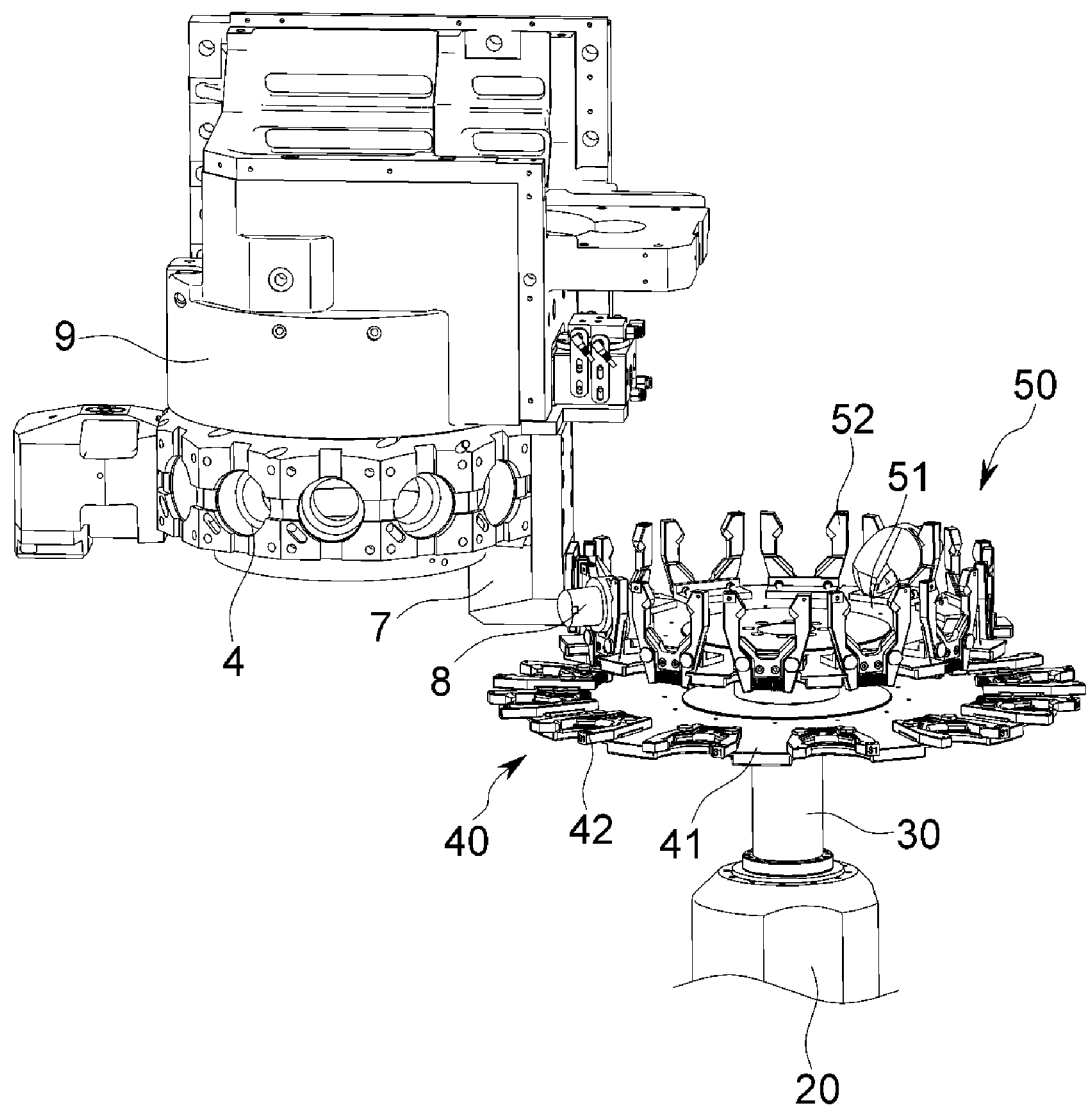
Figure 11:
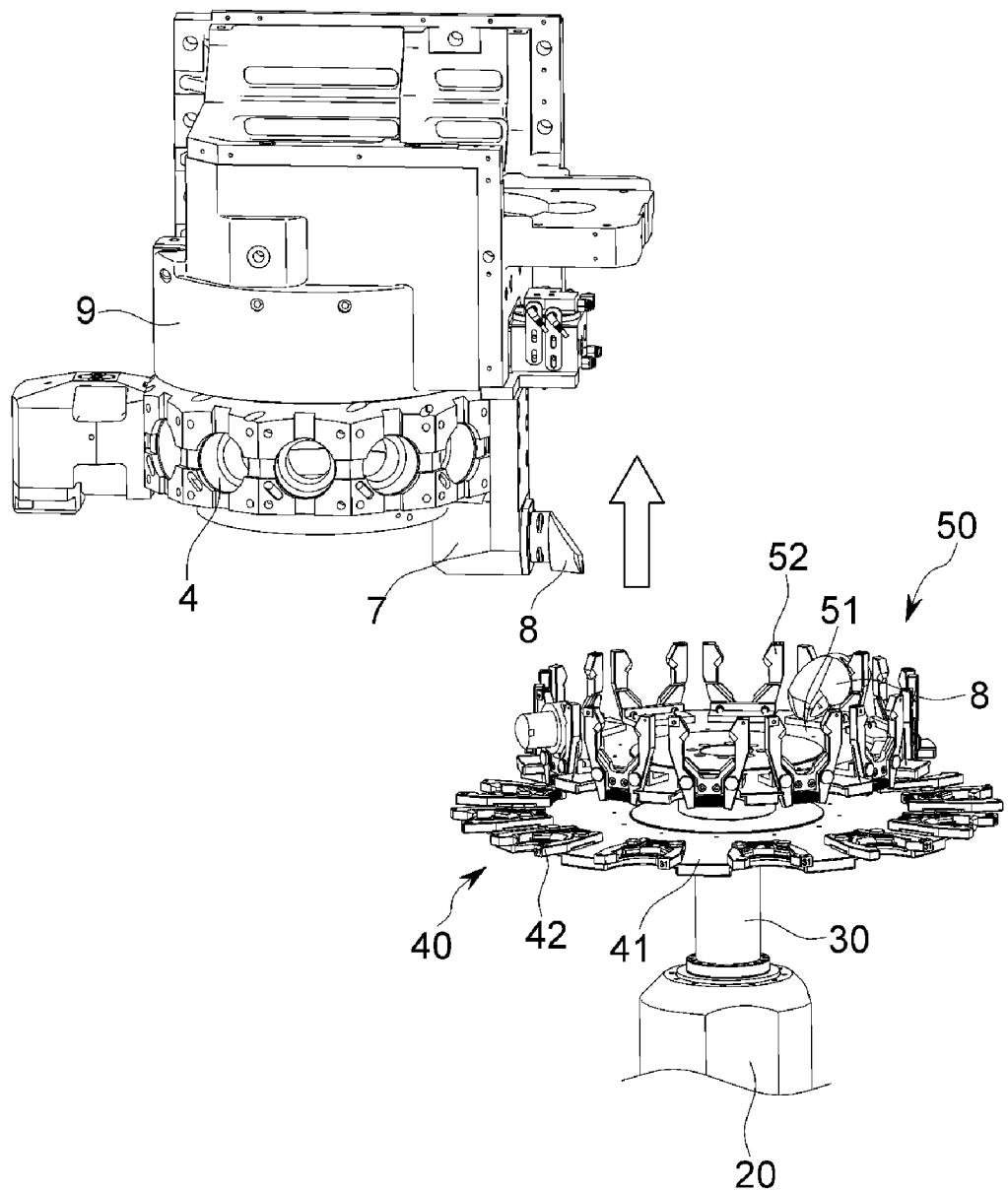

FIG. 4 is a perspective view of a tool magazine for a machine tool according to the present disclosure, and FIG. 5 is a partial top plan view of FIG. 4. FIGS. 6 to 8 are views illustrating a process of changing tools in a first tool receiving unit of the tool magazine for a machine tool according to an exemplary embodiment of the present disclosure. FIGS. 9 to 11 are views illustrating a process of changing tools in a second tool receiving unit of the tool magazine for a machine tool according to the exemplary embodiment of the present disclosure.

The terms used below are defined as follows. The term "horizontal direction" means a transverse direction in the same member, the term "vertical direction" means a height direction in the same member orthogonal to the horizontal direction, and the term "width direction" means a longitudinal direction in the same member orthogonal to the horizontal direction and the vertical direction.

A tool magazine 1 for a machine tool according to an exemplary embodiment of the present disclosure will be described with reference to FIGS. 4 to 11. As illustrated in FIGS. 4 to 11, the tool magazine 1 for a machine tool according to the exemplary embodiment of the present disclosure includes a base unit 10, a support unit 20, a rotary shaft unit 30, a first tool receiving unit 40, and a second tool receiving unit 50.

The tool magazine 1 for a machine tool according to the present disclosure may be applied to all machine tools that change tools by moving spindle heads. FIGS. 4 to 11 illustrate a vertical type turning center as an example, but the present disclosure is not necessarily limited thereto. The tool magazine 1 for a machine tool according to the present disclosure may be applied to all machine tools in which a gripper of a tool magazine presses and clamps a tool by moving a spindle head in order to change the tools.

The base unit 10 is installed in a part of a space in which a spindle head 9 moves. The base unit 10 is made of a metal material and installed at one side of the machine tool to perform a function of stably supporting the tool magazine.

The support unit 20 is installed to be perpendicular to the base unit 10. That is, the support unit 20 is installed to extend upward in a vertical direction from an upper surface of the base unit 10. The support unit 20 is illustrated as having a hollow and cylindrical shape in FIGS. 4 to 11, but the present disclosure is not necessarily limited thereto. The support unit 20 may have various shapes such as a hollow and rectangular parallelepiped shape.

Although not illustrated in the drawings, a drive unit is installed in the support unit 20 in order to operate the rotary shaft unit 30 to be described below. The drive unit is configured as a servo motor or a motor and operated by an instruction from a PLC or a numerical control unit.

Further, the numerical control unit includes numerical control (NC) or computerized numerical control (CNC) and is embedded with various types of numerical control programs. That is, the numerical control unit is embedded with a program for operating the servo motor which is the drive unit and a program for operating the tools, and the corresponding program is automatically loaded and executed based on the operation of the numerical control unit. In addition, the numerical control unit communicates with a main operating unit and the PLC through a predetermined protocol.

In addition, the main operating unit includes a screen display program and a data input program in accordance with a selection of a screen display and performs a function of displaying a software switch on a display screen in accordance with an output of the screen display program and a function of recognizing an ON/OFF state of the software switch and making an instruction about an input and an output for an operation of the machine.

Further, the main operating unit has a monitor installed in or at one side of a housing or a casing of the machine tool and capable of displaying multifunctional switches or buttons and various types of information, but the present invention is not necessarily limited thereto.

The PLC (programmable logic controller) communicates with the numerical control unit or the main operating unit through the predetermined protocol and serves to make a control instruction through this communication. That is, the PLC operates by receiving a control instruction based on the numerical control program for the numerical control unit or the main operating unit.

The rotary shaft unit 30 is rotatably installed in the support unit 20. The rotary shaft unit 30 is inserted and installed into the support unit 20 so that the rotary shaft unit 30 is rotated by the drive unit installed in the support unit 20 and an upper portion of the rotary shaft unit 30 is exposed to the outside in order to prevent damage and reduce a size of the tool magazine, but the present disclosure is not necessarily limited thereto.

The first tool receiving unit 40 is rotatably installed on the rotary shaft unit 30. In addition, the first tool receiving unit 40 may receive a plurality of tools disposed radially based on a rotation center C of the rotary shaft unit. The tools are received by a plurality of first gripper parts 42 to be described below.

The second tool receiving unit 50 is rotatably installed on the rotary shaft unit 30 so as to be spaced apart vertically from an upper side of the first tool receiving unit 40. In addition, the second tool receiving unit 50 may receive a plurality of tools disposed radially based on the rotation center C of the rotary shaft unit. The tools are received by a plurality of second gripper parts 52 to be described below.

The second tool receiving unit 50 and the first tool receiving unit 40 are installed on the rotary shaft unit 30 so that a tool receiving direction of the second tool receiving unit 50 is orthogonal to a tool receiving direction of the first tool receiving unit 40. Therefore, the tool received by the first tool receiving unit 40 and the tool received by the second tool receiving unit 50 may be installed to be orthogonal to each other, but the present disclosure is not necessarily limited thereto.

As described above, since the tool receiving direction of the second tool receiving unit 50 is orthogonal to the tool receiving direction of the first tool receiving unit 40, the spindle head may easily change the external diameter machining tool (vertical tool) received by the first tool receiving unit and the internal diameter machining tool (horizontal tool) received by the second tool receiving unit while moving in the horizontal direction or the vertical direction, and a large number of tools are received by the first tool receiving unit and the second tool receiving unit, thereby minimizing a space occupied by the tool magazine.

Therefore, according to the tool magazine for a machine tool according to the present disclosure, since the tool receiving direction of the second tool receiving unit is orthogonal to the tool receiving direction of the first tool receiving unit, the spindle head may easily change the internal diameter machining tool and the external diameter machining tool while moving in the horizontal direction and the vertical direction, thereby minimizing non-machining time and improving productivity of the machine tool.

As illustrated in FIGS. 4 and 5, the first tool receiving unit 40 of the tool magazine 1 for a machine tool according to the exemplary embodiment of the present disclosure includes a first main body part 41 and the first gripper parts 42.

The first main body part 41 defines an external shape of the first tool receiving unit 40. The first main body part 41 penetrates the rotation center C of the rotary shaft unit and is rotatably installed on the rotary shaft unit 30. The first main body part 41 is formed in a circular plate shape, but the present disclosure is not necessarily limited thereto.

The plurality of first gripper parts 42 is installed on the first main body part 41 and disposed radially at a predetermined angle based on the rotation center C of the rotary shaft unit, and the first gripper part 42 clamps the tool by pressing the tool. That is, the first gripper part 42 presses a pair of fingers by using a pressing means such as an elastic member and clamps the tool by pressing force. The plurality of first gripper parts 42 is installed on the first main body part 41 such that based on the rotation center C of the rotary shaft unit, 90 first gripper parts 42 are disposed at an angle of 4 degrees with respect to one another, 36 first gripper parts 42 are disposed at an angle of 10 degrees with respect to one another, 24 first gripper parts 42 are disposed at an angle of 15 degrees with respect to one another, 12 first gripper parts 42 are disposed at an angle of 30 degrees with respect to one another, 8 first gripper parts 42 are disposed at an angle of 45 degrees with respect to one another, 6 first gripper parts 42 are disposed at an angle of 60 degrees with respect to one another, 4 first gripper parts 42 are disposed at an angle of 90 degrees with respect to one another, 3 first gripper parts 42 are disposed at an angle of 120 degrees with respect to one another, or 2 first gripper parts 42 are disposed at an angle of 180 degrees with respect to each other. The plurality of first gripper parts 42 is installed at a predetermined angle in accordance with the number of tools required to be installed.

As illustrated in FIGS. 4 and 5, the second tool receiving unit 50 of the tool magazine 1 for a machine tool according to the exemplary embodiment of the present disclosure includes a second main body part 51 and the second gripper parts 52.

The second main body part 51 defines an external shape of the second tool receiving unit 50. The second main body part 51 is spaced apart from the upper side of the first main body part 41 vertically upward based on the rotary shaft unit and rotatable installed on the rotary shaft unit 30 while penetrating the rotation center C of the rotary shaft unit. That is, the second main body part 51 is rotatably installed on the rotary shaft unit 30 and spaced apart from the first main body part 41 vertically upward based on the rotary shaft unit 30, and the second main body part 51 and the first main body part 41 are concentric about the rotation center C of the rotary shaft unit.

The plurality of second gripper parts 52 is installed on the second main body part 51 and disposed radially at a predetermined angle based on the rotation center C of the rotary shaft unit, and the second gripper part 42 clamps the tool by pressing the tool. That is, the second gripper part 52 presses a pair of fingers by using a pressing means such as an elastic member and clamps the tool by pressing force. The plurality of second gripper parts 52 is installed on the second main body part 51 such that based on the rotation center C of the rotary shaft unit, 90 second gripper parts 42 are disposed at an angle of 4 degrees with respect to one another, 36 second gripper parts 42 are disposed at an angle of 10 degrees with respect to one another, 24 second gripper parts 42 are disposed at an angle of 15 degrees with respect to one another, 12 second gripper parts 42 are disposed at an angle of 30 degrees with respect to one another, 8 second gripper parts 42 are disposed at an angle of 45 degrees with respect to one another, 6 second gripper parts 42 are disposed at an angle of 60 degrees with respect to one another, 4 second gripper parts 42 are disposed at an angle of 90 degrees with respect to one another, 3 second gripper parts 42 are disposed at an angle of 120 degrees with respect to one another, or 2 second gripper parts 42 are disposed at an angle of 180 degrees with respect to each other. The plurality of second gripper parts 42 is installed at a predetermined angle in accordance with the number of tools required to be installed.

As illustrated in FIGS. 4 to 11, the internal diameter machining tool (vertical tool) for performing internal diameter machining on a workpiece may be installed on the first gripper part 42 of the first tool receiving unit 40 of the tool magazine 1 for a machine tool according to the exemplary embodiment of the present disclosure, and the external diameter machining tool (horizontal tool) for performing external diameter machining on a workpiece may be installed on the second gripper part 52 of the second tool receiving unit 50.

Further, as illustrated in FIG. 4 to FIG. 11, the tool installed on the first gripper part 42 of the first tool receiving unit 40 of the tool magazine 1 for a machine tool according to the exemplary embodiment of the present disclosure may be changed as the spindle head 9 moves in the vertical direction, and the tool installed on the second gripper part 50 of the second tool receiving unit 50 may be changed as the spindle head 9 moves in the horizontal direction.

According to the tool magazine for a machine tool according to the present disclosure, the tool receiving units are stacked in multiple stages, such that the number of types of tools to be mounted on the tool magazine may be increased, non-machining time may be reduced, and the tools to be changed may be easily stored, thereby achieving convenience and safety for an operator, reducing a size of the tool magazine, and making the machine tool compact.

As illustrated in FIGS. 4 and 5, a diameter D1 of the first main body part of the first tool receiving unit 40 of the tool magazine 1 for a machine tool according to the exemplary embodiment of the present disclosure is larger than a diameter D2 of the second main body part of the second tool receiving unit 50 (D1>D2). If the diameter D1 of the first main body part is equal to or smaller than the diameter D2 of the second main body part (D1<D2), the spindle head cannot change, due to interference, the vertical tool (internal diameter machining tool) and the horizontal tool (external diameter machining tool) while moving in the vertical direction and the horizontal direction. Therefore, it is possible to maximize convenience and ease of change of the internal diameter machining tool and the external diameter machining tool and to achieve convenience for a user.

As illustrated in FIGS. 4 to 11, the internal diameter machining tool (vertical tool) for performing internal diameter machining on a workpiece may be installed on the first gripper part 42 of the first tool receiving unit 40 of the tool magazine 1 for a machine tool according to the exemplary embodiment of the present disclosure, and the external diameter machining tool (horizontal tool) for performing external diameter machining on a workpiece may be installed on the second gripper part 52 of the second tool receiving unit 50.

Therefore, according to the tool magazine for a machine tool according to the present disclosure, the internal diameter machining tool and the external diameter machining tool may be simultaneously used and easily changed, such that stability and reliability of the machine tool may be improved, and the plurality of tools may be stored and the external diameter machining tool and the internal diameter machining tool may be easily changed, such that the broken tool may be quickly replaced, machining precision of the machine tool may be improved, and satisfaction of consumers may be increased.

As illustrated in FIGS. 4 and 5, the first gripper parts 42 are radially disposed on the first main body part 41 and the second gripper parts 52 are radially disposed on the second main body part 51 so that a centerline A of each of the first gripper parts 42 of the first tool receiving unit 40 of the tool magazine 1 for a machine tool according to the exemplary embodiment of the present disclosure and a centerline B of each of the second gripper parts 52 intersect each other based on the rotation center C.

Therefore, the first tool receiving unit 40 and the second tool receiving unit 50 may receive the same number of tools, such that the number of tools to be stored is increased, thereby achieving convenience for a user, reducing the time required to change the tools, and thus improving productivity.

As illustrated in FIGS. 4 and 5, the respective first gripper parts 42 are radially disposed on the first main body part 41 and the respective second gripper parts 52 are radially disposed on the second main body part 51 so that an angle α between the centerlines of the first gripper parts of the first tool receiving unit 40 of the tool magazine 1 for a machine tool according to the exemplary embodiment of the present disclosure is equal to an angle β between the centerlines of the second gripper parts of the second tool receiving unit 50. That is, when the angle α between the centerlines of the first gripper parts and the angle β between the centerlines of the second gripper parts are equal to each other as 30 degrees, the 12 vertical tools (internal diameter machining tools) may be installed on the first tool receiving unit 40 and the 12 horizontal tools (external diameter machining tools) may be installed on the second tool receiving unit 50, but the present disclosure is not necessarily limited thereto.

Therefore, the first tool receiving unit 40 and the second tool receiving unit 50 may be uniformly and constantly disposed, such that the interference may be minimized when the spindle head moves in the horizontal direction and the vertical direction, thereby smoothly, accurately, and easily changing the horizontal tools (external diameter machining tools) and the vertical tools (internal diameter machining tools), thereby improving productivity and achieving convenience for a user.

As illustrated in FIGS. 4 and 5, the first gripper parts 42 are radially disposed on the first main body part 41 and the second gripper parts 52 are radially disposed on the second main body part 52 so that a constant angle θ is formed between the centerline A of the first gripper part 42 of the first tool receiving unit 40 of the tool magazine 1 for a machine tool according to the exemplary embodiment of the present disclosure and the centerline B of the second gripper part 52 of the second tool receiving unit 50, which is adjacent to the first gripper part 42. That is, the angle θ between the centerline A of the first gripper part 42 and the centerline B of the second gripper part 52 of the second tool receiving unit 50, which is adjacent to the first gripper part 42, is constant as 15 degrees, the 12 vertical tools (internal diameter machining tools) may be installed on the first tool receiving unit 40 and the 12 horizontal tools (external diameter machining tools) may be installed on the second tool receiving unit 50, but the present disclosure is not necessarily limited thereto.

Therefore, the spindle head may easily change the internal diameter machining tools and the external diameter machining tools while moving in the horizontal direction and the vertical direction, such that non-machining time may be minimized and productivity of the machine tool may be improved, and the tools to be changed may be easily stored, such that convenience and safety for an operator may be achieved, and a size of the tool magazine may be reduced to implement the compact machine tool.

Although not illustrated in the drawings, the tool magazine 1 for a machine tool according to another exemplary embodiment of the present disclosure may further include a third tool receiving unit.

The third tool receiving unit is rotatably installed on the rotary shaft unit so as to be spaced apart vertically from an upper side of the second tool receiving unit 50. In addition, the third tool receiving unit may receive a plurality of tools disposed radially based on the rotation center of the rotary shaft unit. The tools are received by a plurality of third gripper parts of the third tool receiving unit, respectively.

Therefore, the third tool receiving unit is installed on the rotary unit so that a tool receiving direction of the third tool receiving unit is in parallel with the tool receiving direction of the second tool receiving unit.

That is, the first tool receiving unit 40 receives the vertical tools (internal diameter machining tools), the second tool receiving unit 50 receives the horizontal tools (external diameter machining tools), and the third tool receiving unit receives the horizontal tools (external diameter machining tools), such that the tools received by the first tool receiving unit and the second tool receiving unit are orthogonal to each other, the tools received by the first tool receiving unit and the third tool receiving unit are orthogonal to each other, and the tools received by the second tool receiving unit and the third tool receiving unit are in parallel with each other.

Further, a diameter of the third main body part of the third tool receiving unit is smaller than a diameter of the second main body part of the second tool receiving unit. Therefore, the spindle head may easily change the vertical tools and the horizontal tools without interference while moving in the vertical direction and the horizontal direction, such that non-machining time is reduced, thereby improving productivity of the machine tool. The plurality of required tool may be additionally received, thereby achieving convenience for a user. The first, second, and third tool receiving units are stacked in multiple stages, such that a space occupied by the tool magazine is minimized and a size of the tool magazine is reduced, thereby making the machine tool compact.

An operational principle of the tool magazine for a machine tool according to the present disclosure will be described with reference to FIGS. 4 to 11.

As illustrated in FIGS. 6 to 8, the first main body part 41 is rotated by the operation of the drive unit in the support unit 20 under control of the numerical control unit or the PLC, such that the internal diameter machining tool 6 to be replaced is positioned at a desired position. In addition, a tool post 4 is also rotated under control of the numerical control unit or the PLC, such that the internal diameter machining tool holder 5 for fastening the corresponding internal diameter machining tool 6 is rotated and positioned at a desired position. Thereafter, as illustrated in FIG. 6, according to tool magazine 1 for a machine tool according to the present disclosure, the tool post 4 having the external diameter machining tool holder 7 and the internal diameter machining tool holder 5 and the spindle head 9 for operating the tool post 4 are moved vertically downward in order to mount the internal diameter machining tool 6 on the internal diameter machining tool holder 5. Thereafter, as illustrated in FIG. 7, the internal diameter machining tool 6 of the corresponding first gripper part 42 on the first main body part 41 is inserted and fastened into the corresponding internal diameter machining tool holder 5. Thereafter, as illustrated in FIG. 8, when the spindle head 9 moves to the left in the horizontal direction, the internal diameter machining may be smoothly and quickly performed in a state in which the internal diameter machining tool 6 is inserted into the desired internal diameter machining tool holder 5.

Likewise, as illustrated in FIGS. 9 to 11, the second main body part 51 is rotated by the operation of the drive unit in the support unit 20 under control of the numerical control unit or the PLC, such that the external diameter machining tool 8 to be replaced is positioned at a desired position. In addition, the tool post 4 is also rotated under control of the numerical control unit or the PLC, such that the external diameter machining tool holder 7 for fastening the corresponding external diameter machining tool 8 is rotated and positioned at a desired position. Thereafter, as illustrated in FIG. 9, according to the tool magazine 1 for a machine tool according to the present disclosure, the tool post 4 having the external diameter machining tool holder 7 and the internal diameter machining tool holder 5 and the spindle head 9 for operating the tool post 4 are moved to the right in the horizontal direction (the direction toward the tool magazine) in order to mount the external diameter machining tool 8 on the external diameter machining tool holder 7. Thereafter, as illustrated in FIG. 10, the external diameter machining tool 8 of the corresponding second gripper part 52 on the second main body part 51 is inserted and fastened into the corresponding external diameter machining tool holder 7. Thereafter, as illustrated in FIG. 11, when the spindle head 9 moves upward in the vertical direction, the external diameter machining may be smoothly and quickly performed in a state in which the external diameter machining tool 8 is inserted into the desired external diameter machining tool holder 7.

Therefore, according to the tool magazine for a machine tool according to the present disclosure, the tool receiving direction of the second tool receiving unit is orthogonal to the tool receiving direction of the first tool receiving unit, the tools received by the second tool receiving unit and the first tool receiving unit are orthogonal to each other and disposed in multiple stages, such that the spindle head may easily change the internal diameter machining tools and the external diameter machining tools while moving in the horizontal direction and the vertical direction, thereby minimizing non-machining time, and thus improving productivity of the machine tool. Further, the tools to be changed may be easily stored, thereby achieving convenience and safety for an operator, reducing a size of the tool magazine, and making the machine tool compact.

While the present disclosure has been described above with reference to the exemplary embodiments of the present disclosure in the detailed description of the present disclosure, it may be understood, by those skilled in the art or those of ordinary skill in the art, that the present disclosure may be variously modified and changed without departing from the spirit and scope of the present disclosure disclosed in the claims. Accordingly, the technical scope of the present disclosure should not be limited to the contents disclosed in the detailed description of the specification but should be defined only by the claims.

The invention claimed is:

1. A tool magazine for a machine tool, the tool magazine comprising:
a base unit installed in a part of a space in which a spindle head moves;
a support unit installed to be perpendicular to the base unit;
a rotary shaft unit rotatably installed in the support unit;
a first tool receiving unit rotatably installed on the rotary shaft unit and configured to receive a first plurality of tools disposed radially based on a rotation center of the rotary shaft unit; and
a second tool receiving unit rotatably installed on the rotary shaft unit so as to be spaced apart vertically from an upper side of the first tool receiving unit and configured to receive a second plurality of tools disposed radially based on the rotation center of the rotary shaft unit, wherein,
the first tool receiving unit comprises:
a first main body part rotatably installed on the rotary shaft unit; and
a plurality of first gripper parts installed on the first main body part, the plurality of first gripper parts disposed radially at a predetermined angle based on the rotation center of the rotary shaft unit and oriented such that a respective longitudinal axis of each of the plurality of first gripper parts extends horizontally, and each of the plurality of first gripper parts is configured to clamp, between a pair of gripper fingers thereof that are biased by an elastic member, a respective tool of the first plurality of tools by pressing on the respective tool,
the second tool receiving unit comprises:
a second main body part rotatably installed on the rotary shaft unit so as to be spaced apart vertically from an upper side of the first main body part; and
a plurality of second gripper parts installed on the second main body part, the plurality of second gripper parts disposed radially at a predetermined angle based on the rotation center of the rotary shaft unit and oriented such that a respective longitudinal axis of each of the plurality of second gripper parts extends vertically, and each of the plurality of second gripper parts is configured to clamp, between a pair of gripper fingers thereof that are biased by an elastic member, a respective tool of the second plurality of tools by pressing on the respective tool.

2. The tool magazine of claim 1, wherein a diameter of the first main body part is larger than a diameter of the second main body part.

3. The tool magazine of claim 1, wherein the plurality of first gripper parts are disposed on the first main body part and the plurality of second gripper parts are disposed on the second main body part so that a centerline of each of the plurality of first gripper parts and a centerline of each of the plurality of second gripper parts intersect each other at the rotation center.

4. The tool magazine of claim 1, wherein the plurality of first gripper parts are disposed on the first main body part and the plurality of second gripper parts are disposed on the second main body part so that an angle between centerlines of the plurality of first gripper parts is equal to an angle between centerlines of the plurality of second gripper parts.

5. The tool magazine of claim 1, wherein the plurality of first gripper parts are disposed on the first main body part and the plurality of second gripper parts are disposed on the second main body part so that a constant angle is formed between a centerline of one of the plurality of first gripper parts and a centerline of one of the plurality of second gripper parts that is disposed adjacent to the one of the plurality of first gripper parts.

6. The tool magazine of claim 1, wherein
each of the first plurality of tools is embodied as a respective internal diameter machining tool for performing internal diameter machining on a workpiece and is clamped by a respective one of the plurality of first gripper parts, and
each of the second plurality of tools is embodied as a respective external diameter machining tool for performing external diameter machining on the workpiece and is clamped by a respective one of the plurality of second gripper parts.

7. The tool magazine of claim 1, wherein
the spindle head changes a given one of the first plurality of tools installed on the first tool receiving unit by moving in a vertical direction, and
the spindle head changes a given one of the second plurality of tools installed on the second tool receiving unit by moving in a horizontal direction.

8. The tool magazine of claim 1, further comprising:
a third tool receiving unit rotatably installed on the rotary shaft unit so as to be spaced apart vertically from an upper side of the second tool receiving unit and configured to receive a third plurality of tools disposed radially based on the rotation center of the rotary shaft unit,
wherein a tool receiving direction of the third tool receiving unit is in parallel with a tool receiving direction of the second tool receiving unit.

* * * * *